United States Patent

[11] 3,612,622

| [72] | Inventor | Hugh E. Riordan<br>Ann Arbor, Mich. |
|---|---|---|
| [21] | Appl. No. | 802,991 |
| [22] | Filed | Feb. 27, 1969 |
| [45] | Patented | Oct. 12, 1971 |
| [73] | Assignee | Kelsey-Hayes Company<br>Romulus, Mich. |

[54] SKID CONTROL SYSTEM
12 Claims, 2 Drawing Figs.

[52] U.S. Cl. .................................................. 303/21 P,
188/181 A
[51] Int. Cl. ................................................... B60t 8/08
[50] Field of Search ........................................... 303/21,
61–63, 68–69; 188/181

[56] References Cited
UNITED STATES PATENTS
3,467,443  9/1969  Okamoto et al. ............. 303/21

| 2,980,369 | 4/1961 | Ruof .............................. | 303/21 UX |
| 3,245,727 | 4/1966 | Anderson et al. ............. | 303/21 |
| 3,362,747 | 1/1968 | Marcheron .................... | 303/21 |

*Primary Examiner*—Milton Buchler
*Assistant Examiner*—John J. McLaughlin
*Attorney*—Harness, Dickey & Pierce

ABSTRACT: A skid control system for a wheeled vehicle varies the braking pressure as a function of the slip, the difference between vehicle speed and wheel speed. A vehicle analogue circuit provides a signal V1 representative of the reduction in vehicle velocity during braking. The instantaneous vehicle velocity Vv is obtained by substracting the loss of vehicle velocity V1 from the initial vehicle velocity Vw1. The instantaneous vehicle velocity Vv is fed to a difference circuit which produces an output signal X when the wheel velocity Vw and a slip reference signal Vsr exceed signal Vv. Output signal X causes actuation of a modulator to relieve brake pressure.

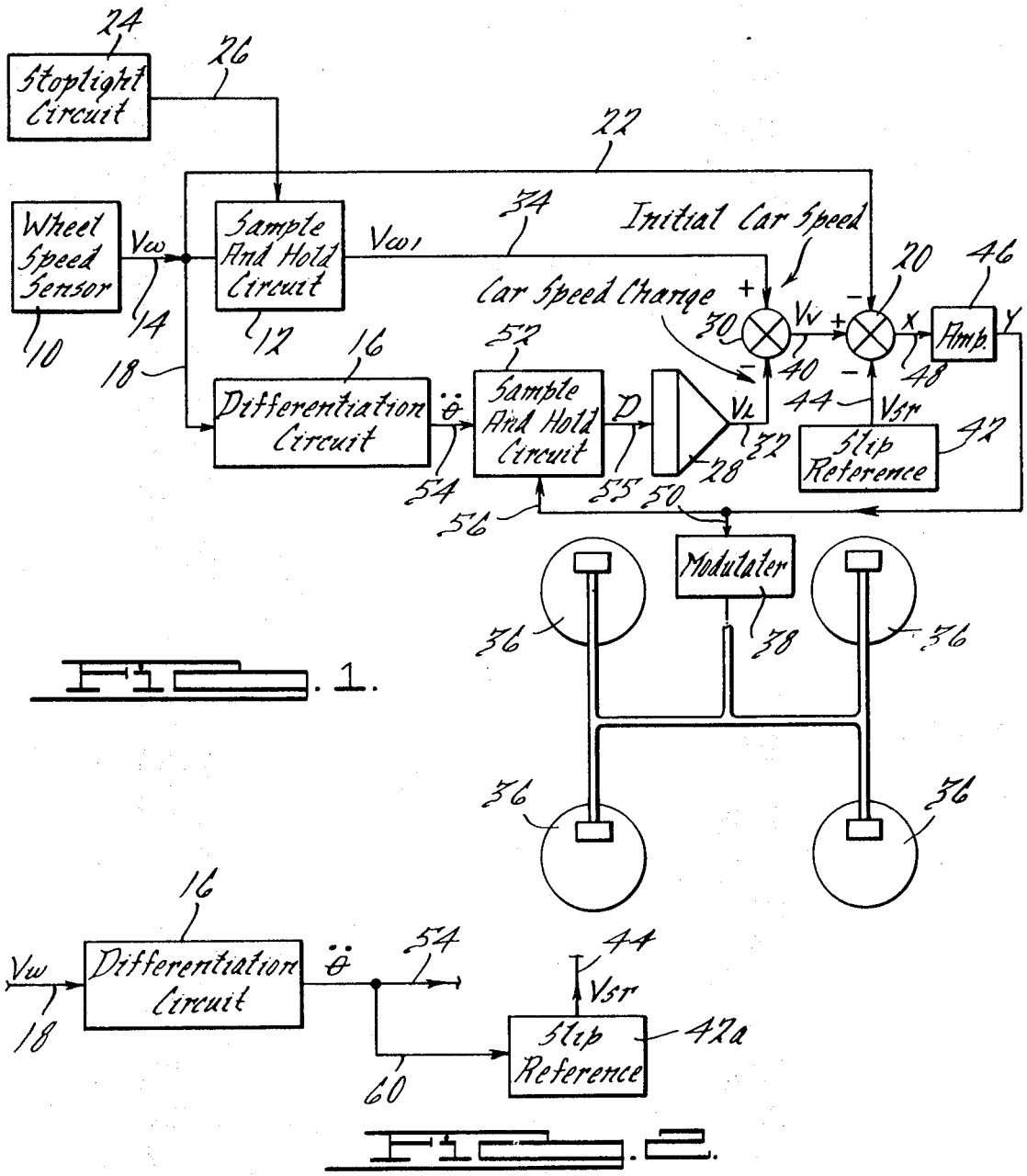

SKID CONTROL SYSTEM

SUMMARY BACKGROUND OF THE INVENTION

The present invention relates to a skid control system for wheeled vehicles.

Braking effectiveness of a wheeled vehicle can be maximized by use of a skid control system which modulates the braking effect such that the slip (difference between vehicle velocity and wheel velocity) is maintained at a determinable, ideal magnitude. The determination of slip requires sensing of both vehicle velocity and wheel velocity. While wheel velocity can be readily attained, a measure of vehicle velocity requires relatively involved and expensive apparatus. In the present invention the vehicle velocity is approximated by an analogue which requires only information which can be readily obtained from wheel speed. Therefore it is an object of the present invention to provide a skid control system operative as a function of slip which is determined approximating vehicle velocity by means of an analogue utilizing wheel speed information.

It is another object of the present invention to provide a novel skid control system.

Other objects, features, and advantages of the present invention will become apparent from the subsequent description and the appended claims, taken in conjunction with the accompanying drawings, in which:

FIG. 1 is a block diagram exemplifying the system of he present invention; and

FIG. 2 is a partial lock diagram of a modified form of the system of FIG. 1.

Looking now to FIG. 1 a wheel-speed sensor 10 provides a signal Vw which has magnitude indicative of the velocity of the wheel with which it is associated. The velocity signal Vw is transmitted to a sample and hold circuit 12 via conductor 14, a differentiating circuit 16 via conductor 18 and a difference circuit 20 via conductor 22. The sample and hold circuit 12 receives the signal Vw and in response to signal Z via conductor 26 from brake light switch 24, which is actuated upon brake actuation, will retain the magnitude of wheel velocity Vw just prior to brake actuation (i.e., prior to occurrence of signal Z) and will provide an output signal Vw1 indicative of that magnitude. Since prior to brake application there is substantially zero slip between the vehicle and the wheels, the signal Vw1 will provide an indication of the vehicle velocity just prior to brake actuation. If the actual deceleration of the vehicle were known, by integration of the vehicle deceleration the actual loss of vehicle velocity could be determined. By subtracting this loss of vehicle velocity from the original vehicle velocity Vw1 the actual, instantaneous vehicle velocity could be obtained. This would require the use of an accelerometer, which could be costly. In the present invention vehicle deceleration is approximated (in a manner to be described) whereby the need for an accelerometer is obviated. Thus in FIG. 1a vehicle analogue circuit 28 is utilized which provides an analogue signal V1 the magnitude of which is indicative of the reduction of vehicle velocity during braking.

The analogue signal V1 is determined by approximating the deceleration rate of the vehicle and increasing the magnitude of the signal V1 at a rate corresponding to the approximated deceleration rate. The manner of approximating the deceleration rate is described later. The loss of vehicle velocity signal V1 is transmitted to a difference circuit 30 via conductor 32 while the initial vehicle velocity signal Vw1 is transmitted to the difference circuit 30 via conductor 34. By subtracting the loss of vehicle velocity during braking from the initial vehicle velocity the instantaneous vehicle velocity is obtained. This is done by the difference circuit 30 which provides a vehicle velocity signal Vv the magnitude of which is indicative of he instantaneous vehicle velocity.

When the slip exceeds a selected magnitude indicative of an incipient skid condition, pressure to the brakes 36 is relieved by modulating valve 38 permitting the wheels to spin-up. The modulating valve 38 can be of the type shown in the copending U.S. Pat. application of Every et al., Ser. No. 642,861, filed June 1, 1967 and that application is incroporated herein by reference.

The determination of when the slip exceeds the selected magnitude is provided by difference circuit 20 which receives the vehicle velocity signal Vv via conductor 40 and which also receives a reference slip velocity signal Vsr from slip reference circuit 42 via conductor 44. The magnitude of reference Vsr is selected as indicative of magnitude of actual slip at which pressure to the brakes 36 is to be relieved. The difference circuit subtracts the wheel velocity signal Vw (received via conductor 22) from the instantaneous vehicle velocity signal Vv (which alone is a determination of instantaneous slip, i.e., vehicle velocity minus wheel velocity) and at the same time subtracts the magnitude of the slip reference signal Vsr. The difference circuit 20 will provide an output signal X hen the signals Vw and Vsr together exceed the signal Vv; this indicates that the sip is excessive, i.e., exceeds the magnitude of the reference slip he output signal X is transmitted to an amplifier circuit 46 via conductor 48. The amplifier circuit 46 in response to signal X will provide an actuating signal Y to modulating valve 38 via conductor 50 whereby the pressure to brakes 36 will be relieved to a low level. As the wheels spin-up and the slip decreases the signals X and Y will be terminated and modulating valve 38 will cause reapplication of brake pressure and the cycle will repeat.

When the wheels spin-up the differentiating circuit 16 will provide an output signal $\dot{\theta}$ the magnitude of which is indicative of the acceleration of the wheels, i.e., the result of he differentiation of instantaneous wheel velocity signal w. The magnitude of this signal $\dot{\theta}$ is retained by sample and hold circuit 52 which receives signal $\dot{\theta}$ via conductor 54. The spin-up rate (acceleration of wheels during relief of brake pressure) will vary in accordance with the coefficient of friction, $u$, between the tire and the road. Thus for a low $u$ surface spin-up will be slow, i.e., low magnitude and for a high $u$ surface spin-up will be rapid. In a similar manner the deceleration of the vehicle through braking will vary with the $u$ of the surface, knowing the $u$ of the surface of the deceleration rate can be determined. Thus the sample and hold circuit provides an output signal D the magnitude of which is indicative of the magnitude of wheel spin-up and hence of vehicle deceleration. The signal D is transmitted to analogue circuit 28 via conductors 55 in response to which the generation of signal V1 will be initiated and with he magnitude of the rate of change of increase in magnitude of signal V1 being varied in accordance with magnitude of signal D. The sample and hold circuit 52 is actuable and responsive to $\dot{\theta}$ only during spin-up and hence only while signal Y is present via conductor 56. The sample and hold circuit 52 ill hold the prior spin-up signal nd provide signal D throughout the control cycle and will readjust the magnitude of signal D upon each occurrence of signal Y to reflect any changes in spin-up rate $\dot{\theta}$ and hence reflect changes in vehicle deceleration. Hence as signal D is varied in magnitude the magnitude of rate of change of velocity loss signal V1 is correspondingly varied.

In the embodiment FIG. 1 a constant reference slip (signal Vsr) was selected as indicative of an incipient skid condition. In order to maximize braking force it is desirable for different $u$ surfaces to relieve brake pressure at different magnitudes of slip. For high $u$ surfaces he magnitude of slip is higher for maximum braking force that for low $u$ surfaces. Since spin-up is indicative of the $u$ of the surface a variation in magnitude of the reference slip Vsr with variations in spin-up ($\dot{\theta}$) will provide the desired result. Thus in FIG. 2, the slip reference circuit 42a receives the spin-up signal $\dot{\theta}$ via conductor 60 and increases the magnitude of Vsr as $\dot{\theta}$ decreases and vice versa, whereby the reference slip signal Vsr will be indicative of that magnitude of slip to provide maximum braking force at the wheels for different $u$ surfaces.

Since the specific construction details of the sensor 10 and modulating valve 38 and the specific circuit details of the various circuits 12, 16, 20, etc. are within the purview of one skilled in the art and since these constructional and circuit details in no way constitute part of the present invention, these details have been omitted for the purpose of simplicity.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A skid control system for a wheeled vehicle having an actuatable braking system for at least one wheel, the skid control system comprising: first means for providing a wheel speed signal having a magnitude indicative of the velocity of that one wheel, analogue means responsive to said wheel speed signal for providing a vehicle velocity analogue signal during a skid condition having magnitude indicative of the instantaneous velocity of the vehicle said analogue means including means for varying magnitude of the analogue signal during actuation of said braking system as a function of the variation in magnitude of said wheel speed signal.

2. The system of claim 1 said function being the rate of change of said magnitude of said wheel speed signal.

3. A skid control system for a wheeled vehicle having a braking system for at least one wheel and modulating means for relieving the brake actuation at at least said one wheel during a detected skid condition allowing spin-up of said wheel, the skid control system comprising: first means for providing a wheel speed signal having a magnitude indicative of the velocity of that one wheel, analogue means responsive to said wheel speed signal for providing vehicle velocity analogue signal having a magnitude indicative of the instantaneous velocity of the vehicle said analogue means including means for varying magnitude of the analogue signal as a function of the rate of change of the magnitude of said wheel speed signal during spinup.

4. The system of claim 3 with said analogue means including hold means responsive to said wheel speed signal and to initiation of actuation of the braking system for providing an initial wheel speed signal indicative of the magnitude of said wheel speed signal prior to actuation and velocity change means responsive to said function of said wheel speed signal for providing a vehicle velocity change signal having a magnitude indicative of the change in velocity of the vehicle during braking.

5. The system f claim 4 with said vehicle velocity analogue signal being derived from said initial wheel speed signal and said vehicle velocity change signal.

6. The system of claim 5 including modulating means for modulating the braking system in response to an output signal, output means for providing said output signal in response to said initial wheel speed signal, said vehicle velocity change signal and said wheel speed signal having a preselected relationship indicative of a skid condition.

The system of claim 6 with said output signal means responsive to the magnitude of a reference signal indicative of a determinable magnitude of slip relative to the slip indication derived from said initial wheel speed signal, said vehicle velocity change signal, and said wheel speed signal.

8. The system of claim 7 with said reference signal having fixed magnitude.

9. The system of claim 8 with said reference signal having a magnitude varying in accordance with said function of said wheel speed signal.

10. The system of claim 7 with said reference signal having a magnitude varying in accordance with variations in the magnitude of said wheel speed signal.

11. The system of claim 7 with said analogue means including memory means for retaining the magnitude of said rate of change of said wheel speed signal, said means responsive to said output signal for readjusting the magnitude of said rate of change of said wheel speed to correspond to that magnitude occuring during the spin-up resulting from the occurrence of said output signal.

12. The system of claim 4 with the rate of change of said vehicle velocity change signal being determined by said rate of change of said magnitude of said wheel speed signal.

UNITED STATES PATENT OFFICE
CERTIFICATE OF CORRECTION

Patent No. 3,612,622  Dated October 12, 1971

Inventor(s) Hugh E. Riordan

It is certified that error appears in the above-identified patent and that said Letters Patent are hereby corrected as shown below:

Col. 1, line 30, "lock" should be --block--; Col. 1, line 70, "he" should be --the--; Col. 2, line 2, "incroporated" should be --incorporated--; Col. 2, line 16, "hen" should be --when--; Col. 2, line 18, "sip" should be --slip--; Col. 2, line 19, "he" should be --the--; Col. 2, line 29, "he" should be --the--; Col. 2, line 30, "signal w" should be --signal Vw--; Col. 2, line 46, "he" should be --the--; Col. 2, line 51, "ill" should be --will--; Col. 2, line 51, "nd" should be --and--; Col. 2, line 54, "rate $\ddot{\theta}$ and" should be --rate ($\theta$) and--; Col. 2, line 58, "embodiment Fig. 1" should be --embodiment of Fig. 1--; Col. 2, line 69, "as $\ddot{\theta}0$ decreases" should be --as $\ddot{\theta}$ decreases--; Col. 4, (claim 5), line 7, "f" should be --of--; Col. 4, line 16, Claim 7 is not numbered; Col. 4, Claim 9 should be Claim 10 and Claim 10 should be Claim 9.

Signed and sealed this 5th day of December 1972.

(SEAL)
Attest:

EDWARD M. FLETCHER, JR.
Attesting Officer

ROBERT GOTTSCHALK
Commissioner of Patents